Oct. 5, 1971                J. GUILLOT                3,609,966
GAS TURBINE HAVING AN INLET AND OUTLET ARRANGEMENT
SUITABLE FOR AUTOMATIC VEHICLES
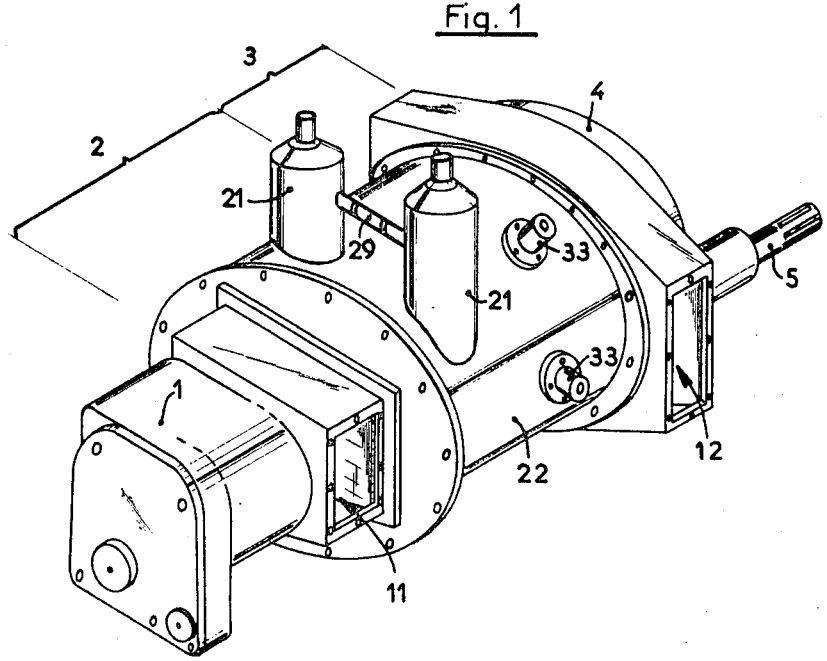
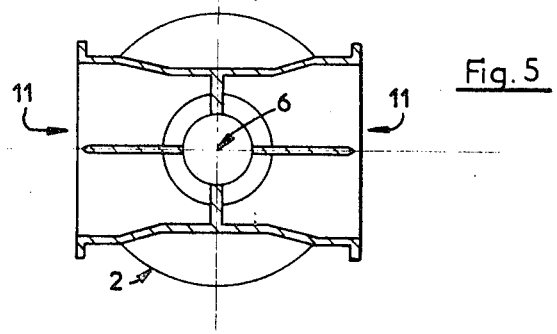

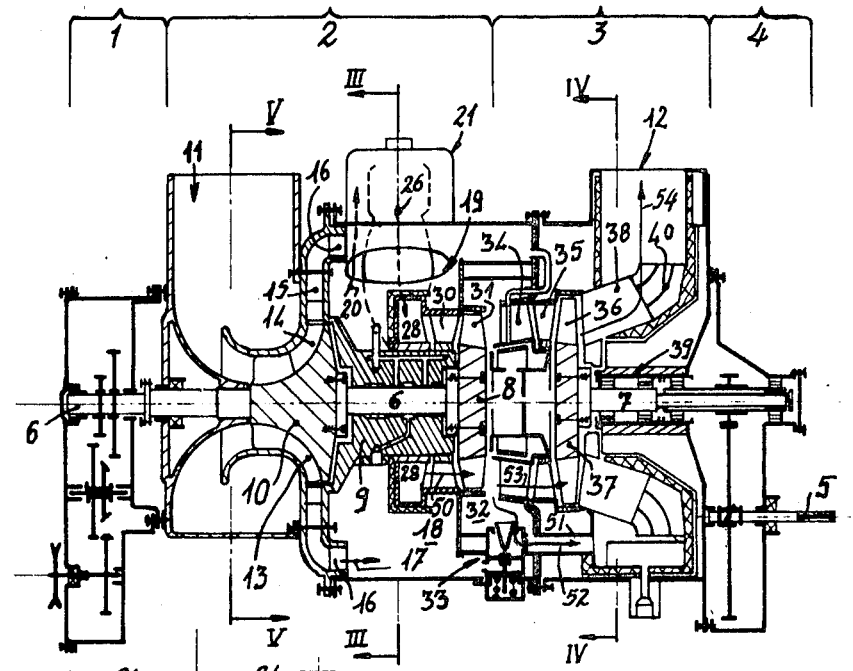
Fig. 2
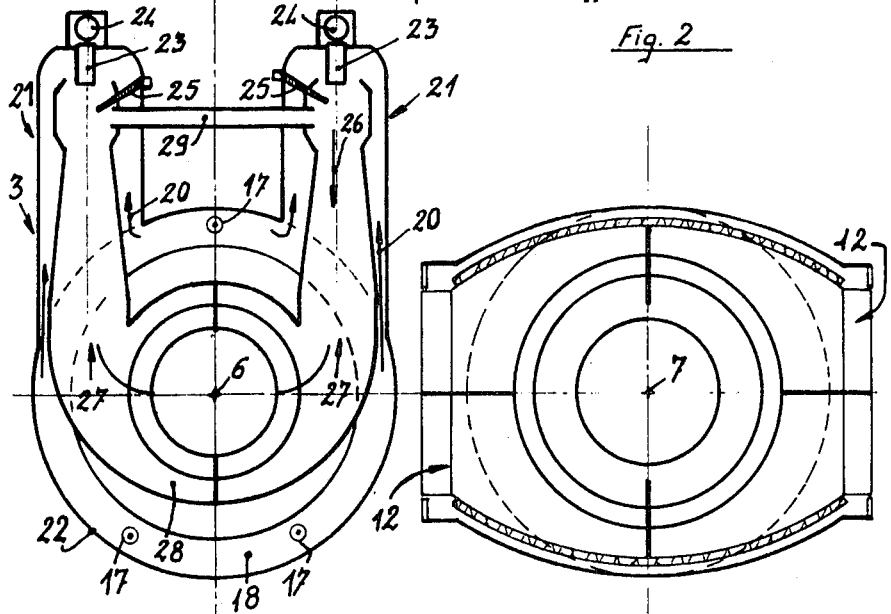
Fig. 3
Fig. 4

United States Patent Office 3,609,966
Patented Oct. 5, 1971

3,609,966
GAS TURBINE HAVING AN INLET AND OUTLET ARRANGEMENT SUITABLE FOR AUTOMOTIVE VEHICLES
Jack Guillot, Blanc-Mesnil, France, assignor to Etablissements Bennes Marrel, Saint Etienne (Loire), France
Filed June 10, 1969, Ser. No. 831,901
Claims priority, application France, July 8, 1968, 50,194
Int. Cl. F02c
U.S. Cl. 60—39.16    3 Claims

ABSTRACT OF THE DISCLOSURE

A gas turbine is provided with a pair of diametrically opposed radially extending air inlet ducts adjacent the compressor and a pair of diametrically opposed, radially extending exhaust ducts adjacent the power turbine rotor means to adapt the turbine for automotive installation. A pair of parallel, cylindrical combustion chambers are disposed normal to the diametrically opposed inlet ducts and a bypass channel having a suitable control valve extends from a point intermediate the high pressure turbine rotor and the low pressure turbine rotor to the exhaust ducts.

---

The present invention concerns a gas turbine suitable for various uses, and more particularly, for use in automobile vehicles.

Gas turbines have been fitted in aircraft, or in fixed installations such as, power stations. For various reasons, chiefly those of size and output, these gas turbines are difficult to use in the form of independent mobile motor assemblies, particularly in goods vehicles.

The principal object of the present invention is to avoid these disadvantages by producing a gas turbine, the form of which is very compact and capable of being conveniently mounted on a goods vehicle, whilst ensuring a satisfactory heat yield and a relatively low noise level.

A gas turbine according to the invention, comprises two separate shafts, the first of which having keyed thereon an intake centrifuge compressor and the rotor of a high pressure turbine and the second shaft being connected to the wheel of a low pressure turbine in which the forward end of the input shaft drives the gears of a control case for ancillary devices behind which there are disposed two air intakes diametrically opposed to one another which open out into the intake of the compressor which drives the air into two counterflow combustion chambers disposed parallel to each other on a plane perpendicular to the axis of rotation of the rotors, so that the hot gases displaced by these chambers flow out at two diametrically opposed points into a distributor ring which actuates the high pressure turbine rotor, the combustion chambers being disposed on a transverse plane between the wheel of the compressor and the wheel of the high pressure turbine at the outlet of which the gases flow over the rotor of the low pressure turbine to be then covered by an annular expansion conduit having a tapered cross-section towards two diametrically opposed exhaust outlets, whilst the support bearing of the shaft of the low pressure rotor is disposed in the centre of the tapering conduit, said shaft driving the members of a reduction gear located on the other side of the bearing, the output shaft of which gear forms the power supply for the unit.

It will be understood that a gas turbine constructed on this general pattern constitutes a very compact unit capable of being fitted on an automobile vehicle. The arrangement of the two combustion chambers makes it possible not only to reduce the total space required, but also to ensure, the engine gases, high uniformity and a correct homogenous mixture of the gases. Finally, the unit lends itself to satisfactory sound-proofing.

The accompanying drawings, given by way of example only, will enable the features of the invention to be more clearly understood.

FIG. 1 is an overall view of a driving unit incorporating a gas turbine according to the invention.

FIG. 2 is an axial section in which, for clarity, an intake and an exhaust have been removed from the plane of the section.

FIG. 3 is a section taken on the line III—III (FIG. 2) showing the arrangement of the counterflow combustion chambers.

FIG. 4 is a section taken on the line IV—IV (FIG. 2) showing the arrangement of the exhaust outlets.

FIG. 5 is a section taken on the line V—V (FIG. 2) illustrating the arrangement of the intakes.

The turbine shown in the drawings can be conveniently divided into four sections, namely:

A control box 1 for ancillary devices,

A gas generator unit 2 comprising a compressor, combustion chambers and high pressure turbines.

A driving unit 3 formed by a low pressure turbine,

A reduction gear assembly 4, the drive shaft 5 of which forms a power source capable of being connected to the transmission members of a vehicle.

The control box 1 of the ancillary devices is shown schematically in the drawings as is the reduction gear 4.

The turbine itself comprises two independent shafts 6 and 7 (FIG. 2), the two being on the same axis, end to end. Keyed on the rear end of the compressor shaft 6 is a rotor 8 of a high pressure turbine. The shaft 6 is carried by a centre bearing 9. On the other side of this bearing the shaft carries a rotor 10 of a centrifuge compressor. Beyond the rotor 10, the shaft 6 terminates in a stub 7 which drives the members of the control box 1.

According to one of the features of the invention, the intake casing comprises two lateral openings 11 which are diametrically opposed to one another (FIGS. 1 and 5).

This arrangement has a two-fold advantage.

Firstly, it is made possible to eliminate an intake collector or the like disposed axially of the intake of the rotor 10 of the compressor, the presence of such a collector being detrimental to the uniformity of speed distribution within the gas exhaust.

Secondly, it facilitates the positioning of silencing filters (not shown) on the intake, a feature which is essential for a turboengine unit to be fitted on automobiles. For the same reasons, the exhaust gases pass to a casing which comprises two side outlets 12 diametrically opposed to each other (FIGS. 1 and 4).

The rotor 10 of the compressor comprises two series of blades, one 13, of a helical shape at the intake and radial at the output, the other 14, being purely radial. The rotor 10 drives the intake air through the fixed blades 15 of a diffuser, the blades 15 being distributed over an annular crown in the same transverse plane.

The output of the diffuser 15 is guided then directed axially through the crown of fixed blades 16 of a direction rectifier. The air issuing from this rectifier flows axially, as shown in FIG. 2 by the arrow 17, into an annular chamber 18 enclosing a bearing unit 9. Two lateral openings 19 formed in the wall of the chamber 18 permit the relatively cool air disposed therein to flow in the direction of the arrows 20 into two combustion chambers 21 which extend out of the outer hood 22 of the unit 2. The chambers 21 are arranged parallel to each other in the same transverse plane. In each of them the air rises as shown by the arrows 20, to promote the combustion at the level of two nozzles 23. The supply of fuel to the latter is ensured by electric pumps 24. Spark plugs 25 ignite the mixture to start the engine.

The burning gases decend in counterflow in the chamber 21 in the direction of the arrows 26. By means of two diametrically opposed openings 27, the gases pass to an annular chamber 28 in which the pressure and the speed thereof are rendered uniform. To improve the uniformity of the distribution of the hot gases, an interconnecting channel 29 is provided between the two combustion chambers 21. The gases flow out of the chamber 28 in an axial direction and flow through the fixed blades 30 of an initial stator distributor before engaging the displaceable blades 31 of the rotor 8 as indicated by the arrow 50.

Beyond the rotor 8 of the high pressure turbine, the gases are collected in an annular chamber 32 from which they may either be directed in part to exhaust by the opening of by-pass valve 33 and by-pass channel 51 as indicated by arrow 52 or admitted to a tapered distributor ring 34 which conveys them to the fixed blades 35 of a low pressure distributor as indicated by the arrow 53. At the outlet of this distributor the hot gases flow through the blades 36 of a turbine rotor 37 keyed to the output shaft 7. This low pressure turbine rotor 37 forms the member producing power for driving the vehicle. Having passed through the blades of the rotor 37 the gases flow through a tapering annular collector 38 which enlarges in the direction of the exhaust outlets 12 as indicated by arrow 54.

It is clear that this arrangement makes it possible to locate the principal bearing 39 of the output shaft 7, within a hollow in the centre of the collector 38. The bearing 39 is thus situated in a zone in which it may be heat-insulated from the exhaust gases.

The operational details of such a turbine are as follows:

The compressor shaft 6 continually rotates at a rate of between 27,000 and 43,000 r.p.m., whilst the output shaft 7 of the driving rotor 37 rotates at a rate of between 0 and 37,500 r.p.m. When the assembly is turning slowly, i.e. the vehicle and the output shaft 7 are stopped, the by-pass valves 33 are open. Thus the feeding to the low pressure turbine is partially short-circuited. The supply of combustion gases fed by nozzles 23 is thus at a minimum.

On the contrary, during operation at full power, the valves 33 are closed and the entire flow of gas passes through the blades 36 of the driving rotor 37.

In order to increase the output, the blades 40 may be arranged to form a diffuser in the elbow bend which leads to the exhaust openings 12.

What I claim is:

1. A gas turbine comprising a compressor shaft, compressor blade means secured to said compressor shaft adjacent one end thereof, high pressure turbine rotor means secured to said compressor shaft adjacent the other end thereof, an output shaft disposed in spaced axial alignment with said compressor shaft, low pressure turbine rotor means secured to the end of said output shaft adjacent said compressor shaft, a pair of diametrically opposed air inlet means disposed parallel to the horizontal plane and extending outwardly from said compressor shaft adjacent said compressor blade means, a pair of diametrically opposed exhaust means disposed parallel to the horizontal plane and extending outwardly from said output shaft adjacent said low pressure turbine rotor means, said air inlet means and said exhaust means being disposed parallel to each other, chamber means located intermediate said high pressure turbine rotor means and said low pressure turbine rotor means, by-pass channel means extending between said chamber means and said exhaust means and valve means disposed in said by-pass channel means to control the flow of gases to said low pressure turbine rotor means.

2. A gas turbine comprising a compressor shaft, compressor blade means secured to said compressor shaft adjacent one end thereof, high pressure turbine rotor means secured to said compressor shaft adjacent the other end thereof, an output shaft disposed in spaced axial alignment with said compressor shaft, low pressure turbine rotor means secured to the end of said output shaft adjacent said compressor shaft, a pair of diametrically opposed air inlet means disposed parallel to the horizontal plane and extending outwardly from said compressor shaft adjacent said compressor blade means, an annular high pressure chamber surrounding said compressor shaft intermediate said compressor blade means and said high pressure turbine rotor means, a pair of parallel cylindrical combustion chambers extending outwardly of said annular high pressure chamber on the same side of the turbine and normal to said diametrically opposed air inlet means and a pair of concentrically located chambers disposed in each of said combustion chambers to direct the burning gases inwardly to said high pressure turbine rotor means.

3. A gas turbine as set forth in claim 2 further comprising interconnecting channel means extending between said combustion chambers for improving the uniformity of the distribution of gases.

References Cited

UNITED STATES PATENTS

| 2,627,717 | 2/1953 | Waller | 60—39.17 |
| 2,656,677 | 10/1953 | Peterson | 60—39.17 |
| 2,831,543 | 4/1958 | Mathews | 60—39.16 X |
| 3,196,611 | 7/1965 | Henny | 60—39.16 X |
| 3,255,586 | 6/1966 | Hennig et al. | 60—39.17 X |

FOREIGN PATENTS

| 536,482 | 3/1955 | Belgium | 60—39.16 |

DOUGLAS HART, Primary Examiner

U.S. Cl. X.R.

60—39.17, 39.69; 415—219